Figure 1:
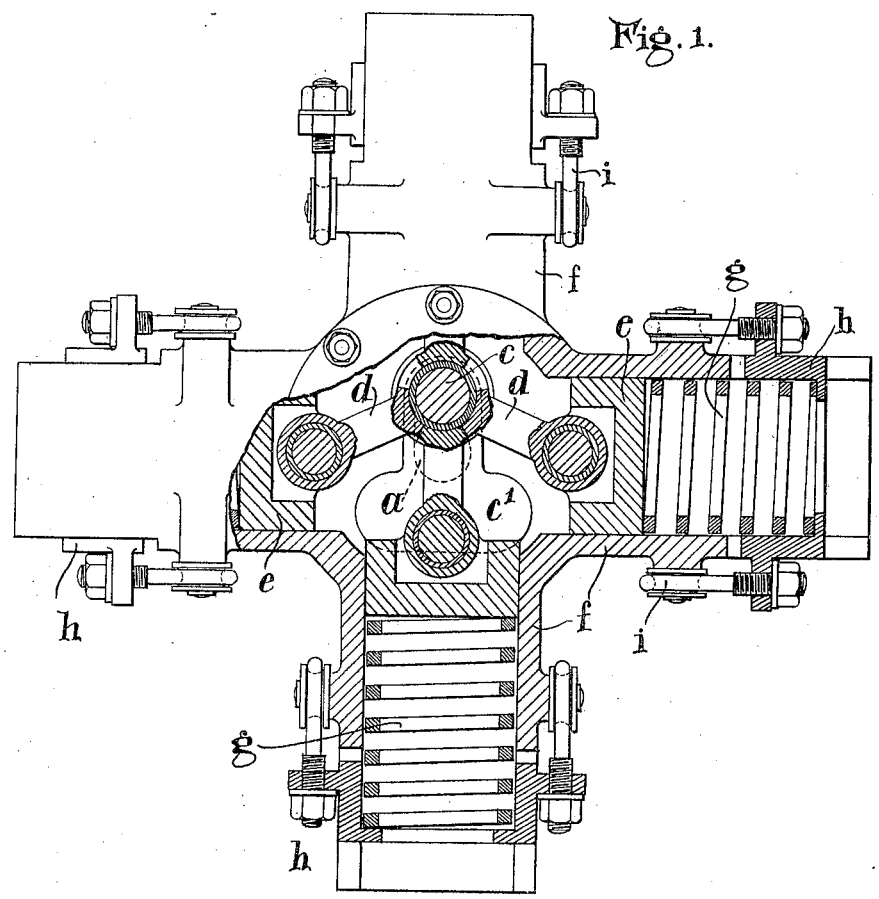

A. J. FIPPARD.
CLUTCH.
APPLICATION FILED APR. 1, 1913.

1,092,344.

Patented Apr. 7, 1914.
2 SHEETS—SHEET 1.

WITNESSES
Frank H Logan
Alfred P Anderson

INVENTOR
A.J. FIPPARD
BY Hvan Dedermeel
ATTORNEY

A. J. FIPPARD.
CLUTCH.
APPLICATION FILED APR. 1, 1913.
1,092,344.
Patented Apr. 7, 1914.
2 SHEETS—SHEET 2.
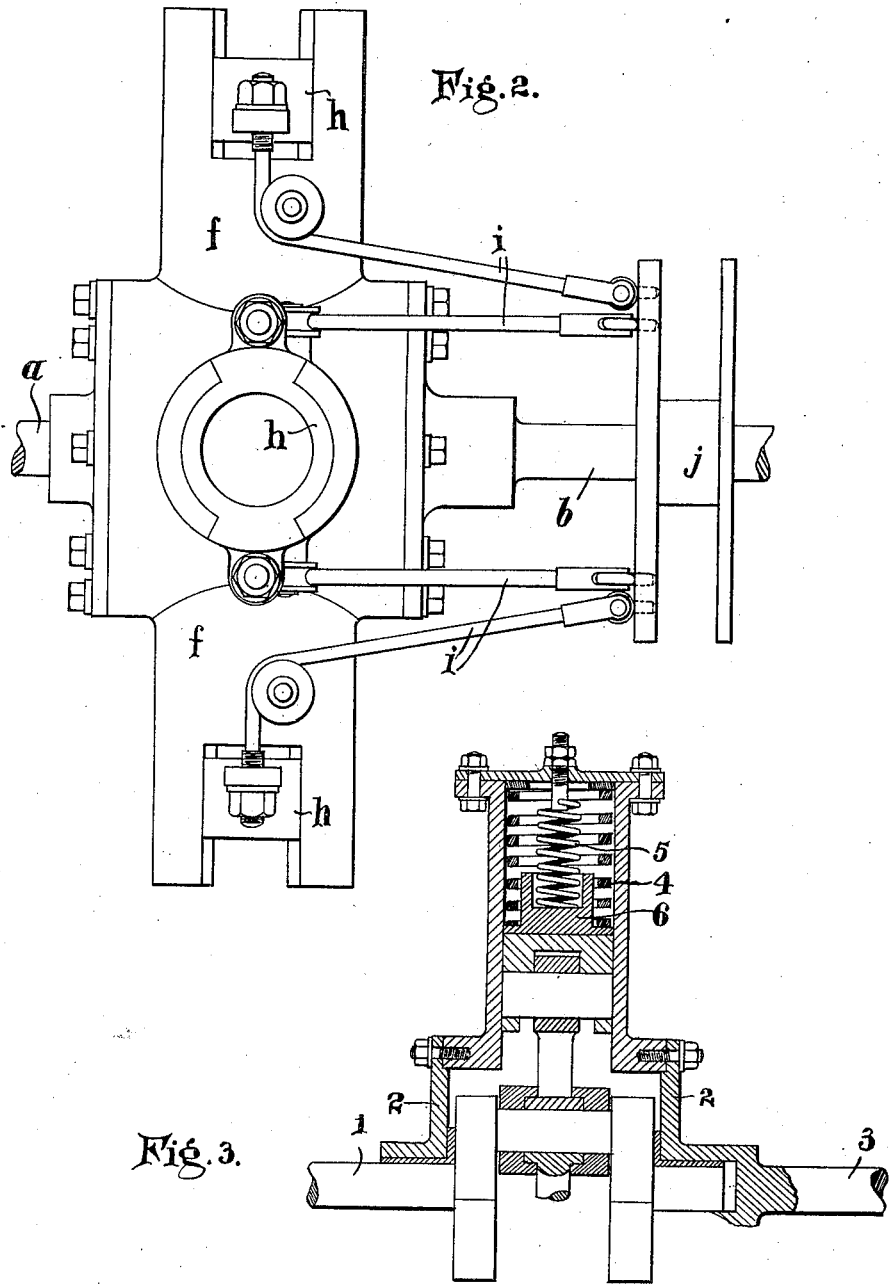
WITNESSES
INVENTOR
A.J. FIPPARD
ATTORNEY

UNITED STATES PATENT OFFICE.

ARTHUR JOHN FIPPARD, OF HANKOW, CHINA, AND BOURNEMOUTH, ENGLAND.

CLUTCH.

1,092,344.    Specification of Letters Patent.    Patented Apr. 7, 1914.

Application filed April 1, 1913.    Serial No. 758,244.

*To all whom it may concern:*

Be it known that I, ARTHUR JOHN FIPPARD, a citizen of the United Kingdom of Great Britain and Ireland, and resident of Hankow, China, and Normanhurst, Burnaby Road, Bournemouth, England, whose permanent address is Burnaby Road, Bournemouth, England, have invented certain new and useful Improvements in Clutches, of which the following is a specification, such as will enable others skilled in the art to which it appertains to make and use the same.

This invention relates to a clutch for conveying rotary motion, in which energy is stored by means of springs, and is particularly designed for use with machinery in which variations in speed are necessary or desirable between driving and driven mechanism, and also in which it is desirable to start or stop the driven part without stopping the driving part.

The invention refers more particularly to clutches of the type in which the power is transmitted from the driving to the driven member through the intermediary of springs the degree of compression of which is capable of variation in accordance with the relative speed desired.

The object of the invention is to provide an improved clutch of the type set forth, which shall be simple in construction and highly efficient in operation.

According to the present invention I provide a clutch for conveying rotary motion having a plurality of cylinders, guides or equivalents arranged around a crank shaft, eccentric or the like in or on which cylinders or guides, pistons, blocks or the like are arranged and are attached to the crank shaft or equivalent, springs being placed in such a position that they control the position of the pistons or the like, the said springs being capable of variation in pressure, in such a manner that they will reduce or increase the distance the pistons or blocks can move in or upon the cylinders or guides so that a variation in speed between the shaft having the crank, eccentric or equivalent and the cylinders is obtainable, the rotation being conveyed either from the said shaft to the cylinders or vice versa. A sufficient pressure may be produced between the pistons and one or more of the springs so that the driven part attains the same speed as the driving part. If sufficient pressure is not produced between the pistons and one or more springs so that the driven part attains the same speed as the driving part, there will be a difference in speed between the two and the amount of the difference will depend upon the amount of compression between the piston and springs. When such difference in speed takes place as soon as any piston passes the point farthest from the center the energy stored in the spring which has been compressed will begin to be returned to the crank shaft and in this way the stored energy will be returned in the form of useful work.

It will be seen that any convenient number of cylinders or guides may be used and that the pistons may be made to work from one or more cranks, eccentrics or their equivalent also that either member may be the free member and that their rotation may be in either direction.

I will now describe my invention with reference to the accompanying drawings, in which—

Figure 1 is a side elevation largely in section of a form of my invention having four cylinders with pistons and compression springs. Fig. 2 is an edge view of Fig. 1, and Fig. 3 shows one cylinder of a modified form of apparatus in which an automatic governor is embodied.

Referring to Figs. 1 and 2 the driving shaft $a$ is in alinement with the driven shaft $b$, the said shaft $a$ being rigid with a crank $c$ counterbalanced by weight $c'$ to which crank the rods $d$ of the pistons $e$ are connected. Behind the pistons $e$ and in the cylinders $f$ compression springs $g$ are arranged, the outer ends of the said springs being fitted within and under the control of ring-like covers $h$, the said covers being connected (by the flexible cables $i$) to a collar $j$ movable as by means of a lever, not shown, to and fro on the shaft $b$.

It will be obvious that when the collar $j$ is moved outwardly and draws upon the cables $i$, the latter will through the medium of the ring cover $h$ produce pressure between the ring covers $h$ and the springs $g$ and a sufficient pressure can be produced between one or more of the ring covers $h$ and the crank $c$ that the work to further compress the springs is greater than the work necessary to make the cylinders revolve and the cylinders will then revolve with the crankshaft and if the pressure on the springs is sufficient to lock the crank c and one or more of the springs then the shaft b which is bolted to the case to which the cylinders are fixed will rotate en bloc with the shaft a. Conversely if the pressure on the springs is removed or the load on the driven shaft greater than the strength of the springs, the pistons will reciprocate in their cylinders and no motion will be conveyed from the shaft a to the shaft b.

In the construction shown in Fig. 3, the crankshaft (1) is again the driver and the case (2) with its shaft (3) are again the driven parts. The larger springs 4 are supplemented by the smaller springs 5 which can be adjusted, as shown, from the outside of the case, so as to control the speed. When the desired speed is exceeded the centrifugal force acting on the weight 6 attached to the lower end of the small springs will be such that the larger springs will be compressed and will allow the crank to travel at a speed greater than the case. The spring 5 acts in conjunction with the spring 4 and when the position of the outer end of spring 5 is varied, the resulting force exerted by the two springs on the weight 6, and consequently the centrifugal force to overcome this, varies. Therefore the speed necessary to create this centrifugal force must vary also.

What I claim and desire to secure by Letters Patent is:—

1. A clutch for conveying rotary motion comprising a driving shaft and a driven shaft, a crank on the driving shaft, rods connected to the crank, guides connected to the rods, the said rods and guides being preferably fashioned as piston rods and pistons, a guiding frame rigid with the driven shaft and preferably in the form of a plurality of cylinders, to receive the guides, springs acting upon the guides and means for varying the pressure of the springs upon the guides.

2. A clutch for conveying rotary motion comprising a driving shaft and a driven shaft, a crank on the driving shaft, rods connected to the crank, guides connected to the rods, the said rods and guides being preferably fashioned as piston rods and pistons, a guiding frame rigid with the driven shaft and preferably in the form of a plurality of cylinders, to receive the guides, springs acting upon the guides and means for varying the pressure of the springs upon the guides, said means consisting of a cover connected to flexible cables capable of being simultaneously moved to exercise, through the cover more or less pressure on the springs.

3. A clutch for conveying rotary motion comprising a driving shaft and a driven shaft, a crank on the driving shaft, rods connected to the crank, guides connected to the rods, the said rods and guides being preferably fashioned as piston rods and pistons, a guiding frame rigid with the driving shaft and preferably in the form of a plurality of cylinders, in which the guides are arranged, springs acting upon the guides and means for varying the pressure of the springs upon the guides.

4. A clutch for conveying the rotary motion comprising a driving shaft and a driven shaft, a crank on the driving shaft, rods connected to the crank, guides connected to the rods, the said rods and guides being preferably fashioned as piston rods and pistons, a guiding frame rigid with the driving shaft and preferably in the form of a plurality of cylinders, in which the guides are arranged, springs acting upon the guides and means for varying the pressure of the springs upon the guides, said means consisting of a cover connected to flexible cables capable of being simultaneously moved to exercise, through the cover, more or less pressure on the springs.

5. A clutch and variable speed gear for conveying rotary motion having a plurality of guides, for example cylinders, arranged around a crankshaft, in which guide blocks, for example pistons are arranged and are attached to the crank, springs being placed in such a position that pressure can be produced between the eccentric and the guides such pressure being capable of variation so that a variation in speed between the shaft having the eccentric and the guides is obtainable.

6. A clutch and variable speed gear for conveying rotary motion having a plurality of guides, for example cylinders, arranged around a crank shaft, in which guide blocks, for example pistons are arranged and are attached to the crank, springs being placed in a position that pressure can be produced between the eccentric and the guides, such pressure being capable of variation so that a variation in speed between the shaft having the eccentric and the guides is obtainable, said variation being produced by the movement of flexible cables attached to covers fitted over the springs.

In witness whereof I have hereunto set my hand in presence of two witnesses.

ARTHUR JOHN FIPPARD.

Witnesses:
 HORACE REMILLARD,
 ROGER S. GREENE.